(12) United States Patent
Ball et al.

(10) Patent No.: US 11,263,178 B2
(45) Date of Patent: Mar. 1, 2022

(54) INTELLIGENT PREDICTION OF FUTURE GENERATION OF TYPES OF DATA OBJECTS BASED ON PAST GROWTH

(71) Applicant: salesforce.com, inc., San Francisco, CA (US)

(72) Inventors: Luke A. Ball, Berkeley, CA (US); Aaron M. Popelka, San Francisco, CA (US); Joshua L. Sarver, Brownsburg, IN (US)

(73) Assignee: salesforce.com, inc., San Francisco, CA (US)

( * ) Notice: Subject to any disclaimer, the term of this patent is extended or adjusted under 35 U.S.C. 154(b) by 306 days.

(21) Appl. No.: 16/264,337

(22) Filed: Jan. 31, 2019

(65) Prior Publication Data

US 2020/0250143 A1 Aug. 6, 2020

(51) Int. Cl.
*G06F 16/174* (2019.01)
*G06N 5/02* (2006.01)

(52) U.S. Cl.
CPC ........... *G06F 16/1748* (2019.01); *G06N 5/02* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Tim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

OTHER PUBLICATIONS

Quick Revision History Dec. 2020, Wolfram, https://www.wolfram.com/mathematica/quick-revision-history.html.*

(Continued)

*Primary Examiner* — Jason G Liao
(74) *Attorney, Agent, or Firm* — Weaver Austin Villeneuve & Sampson LLP

(57) ABSTRACT

Disclosed are some implementations of systems, apparatus, methods, and computer program products for facilitating the prediction of the quantity and/or qualities of new data objects of a particular data object type to be generated based upon past generation of data objects of the particular data object type. Data that is used to generate predictions is obtained and filtered according to criteria that are configurable. In some implementations, the criteria indicate an industry for which predictions are generated, a geographic region for which predictions are generated, and/or time period criteria indicating a time period for which the predictions are generated. Predictions may be generated using a computer-generated model, which may be associated with the particular data object type.

17 Claims, 10 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Tim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,063,632 B2 | 6/2015 | Beechuk et al. |
| 9,177,007 B2 | 11/2015 | Winters et al. |
| 9,529,488 B2 | 12/2016 | Beechuk et al. |
| 9,823,813 B2 | 11/2017 | Beechuk et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0280329 A1 | 9/2014 | Beechuk et al. |
| 2014/0280577 A1 | 9/2014 | Beechuk et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0026650 A1 | 1/2016 | Winters et al. |
| 2016/0026670 A1 | 1/2016 | Winters et al. |
| 2017/0068646 A1 | 3/2017 | Beechuk et al. |
| 2020/0004968 A1* | 1/2020 | Brannon ............ G06F 21/6245 |
| 2020/0250026 A1 | 8/2020 | Popelka et al. |

OTHER PUBLICATIONS

Machine Learning '17, Wolfram, https://reference.wolfram.com/legacy/language/v11.2/guide/MachineLearning.html.*

Predict '17, Wolfram, https://reference.wolfram.com/legacy/language/v11.2/ref/Predict.html.*

ServiceExecute '17, Wolfram, https://reference.wolfram.com/legacy/language/v11.2/ref/ServiceExecute.html.*

TimeSeries '17, Wolfram, https://reference.wolfram.com/legacy/language/v11.2/ref/TimeSeries.html.*

Wolfram Mathematica Online: Bring Mathematica to life on the cloud date unknown [captured by archive.org on Jan. 4, 2018], archive.org, https://web.archive.org/web/20180104005619/https://www.wolfram.com/mathematica/online/.*

GetIntoPC, Wolfram Mathematica 11.2.0.0 Free Download May 26, 2020, getintopcsoftware.com, https://getintopcsoftware.com/maths/wolfram-mathematica-11-2-0-0-free-download/.*

Zhijian et al., How to predit the rows of a table using machine learning? Mar. 9, 2016, stackexchange.com, https://stats.stackexchange.com/questions/200684/how-to-predict-the-rows-of-a-table-using-machine-learning.*

Huisman et al., Data cleaning, wrangling, munging with Mathematica date unknown [captured on Jun. 4, 2017 by archive.org], Wolfram, https://web.archive.org/web/20170604071414/https://community.wolfram.com/groups/-/m/t/855088.*

Anna RG, Preprocessing in Data mining? Aug. 26, 2015, stackexchange.com, https://datascience.stackexchange.com/questions/6908/preprocessing-in-data-mining.*

Ferlitsch, Regression Methods in Machine Learning Splitting Datasets Jul. 2017, Portland Data Science Group, https://www.slideshare.net/AndrewFerlitsch/machine-learning-splitting-datasets.*

Marcus et al., Weighting time series data or prediction Jan. 29, 2016, stackexchange, https://stats.stackexchange.com/questions/192970/weighting-time-series-data-for-prediction.*

FinancialData '17, Wolfram, https://reference.wolfram.com/legacy/language/v11.2/ref/FinancialData.html.*

Geographic Data & Entities '17, Wolfram, https://reference.wolfram.com/legacy/language/v11.2/guide/GeographicData.html.*

Wolfram Language & System 11.2 (2017)|Legacy Documentation [date unknown], Wolfram, 11.2, https://reference.wolfram.com/legacy/language/v11.2/#UserInterfaceConstruction.*

"Google Plus Users", Google+Ripples, Oct. 31, 2011 [retrieved on Feb. 21, 2012 from Internet at http://www.googleplusers.com/google-ripples.html], 3 pages.

* cited by examiner

| | Contact Name | Contact Phone Number | Contact Email | Address: | Contact Record Creation Date |
|---|---|---|---|---|---|
| 612 → | John Johnson | 415-885-8585 | JJohnson@gmail.com | 1750 Jones Street SF, CA 94123 | 01/01/2019 |
| 614 → | Jonathan Johnson | 415-885-8585 | | 1750 Jones Street SF, CA 94123 | 12/18/2017 |
| | Ian Kringle | 415-239-3939 | JKringle@yahoo.com | 800 Green Street SF, CA 94121 | 08/13/2016 |
| | Megan Crowley | 415-849-3232 | MCrowley@yahoo.com | 450 Folsom Street SF, CA 94101 | 07/25/2018 |

*Figure 6*

INTELLIGENT PREDICTION OF FUTURE GENERATION OF TYPES OF DATA OBJECTS BASED ON PAST GROWTH

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with implementation of a prediction engine in an on-demand service environment. More specifically, this patent document discloses techniques for generating predictions in association with types of data objects stored by an associated database system.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with employer network systems, customer relationship management (CRM) systems, social networking systems, email systems, and instant messaging systems, by way of example, in a cloud computing environment.

When a user interacts with a cloud computing service, the user may access a number of different types of data. Often, the cloud computing service supports numerous users and processes data from a number of different data sources. As a result, the amount of data that is maintained can be significant.

BRIEF DESCRIPTION OF THE DRAWINGS

The included drawings are for illustrative purposes and serve only to provide examples of possible structures and process operations for the disclosed inventive systems, apparatus, and methods for implementing a search-based navigation interface to facilitate web site navigation. These drawings in no way limit any changes in form and detail that may be made by one skilled in the art without departing from the spirit and scope of the disclosed embodiments.

FIG. 6 shows an example of a list of Contact database records 600 generated and stored in an on-demand database service environment, in accordance with some implementations.

DETAILED DESCRIPTION

Figure 1:
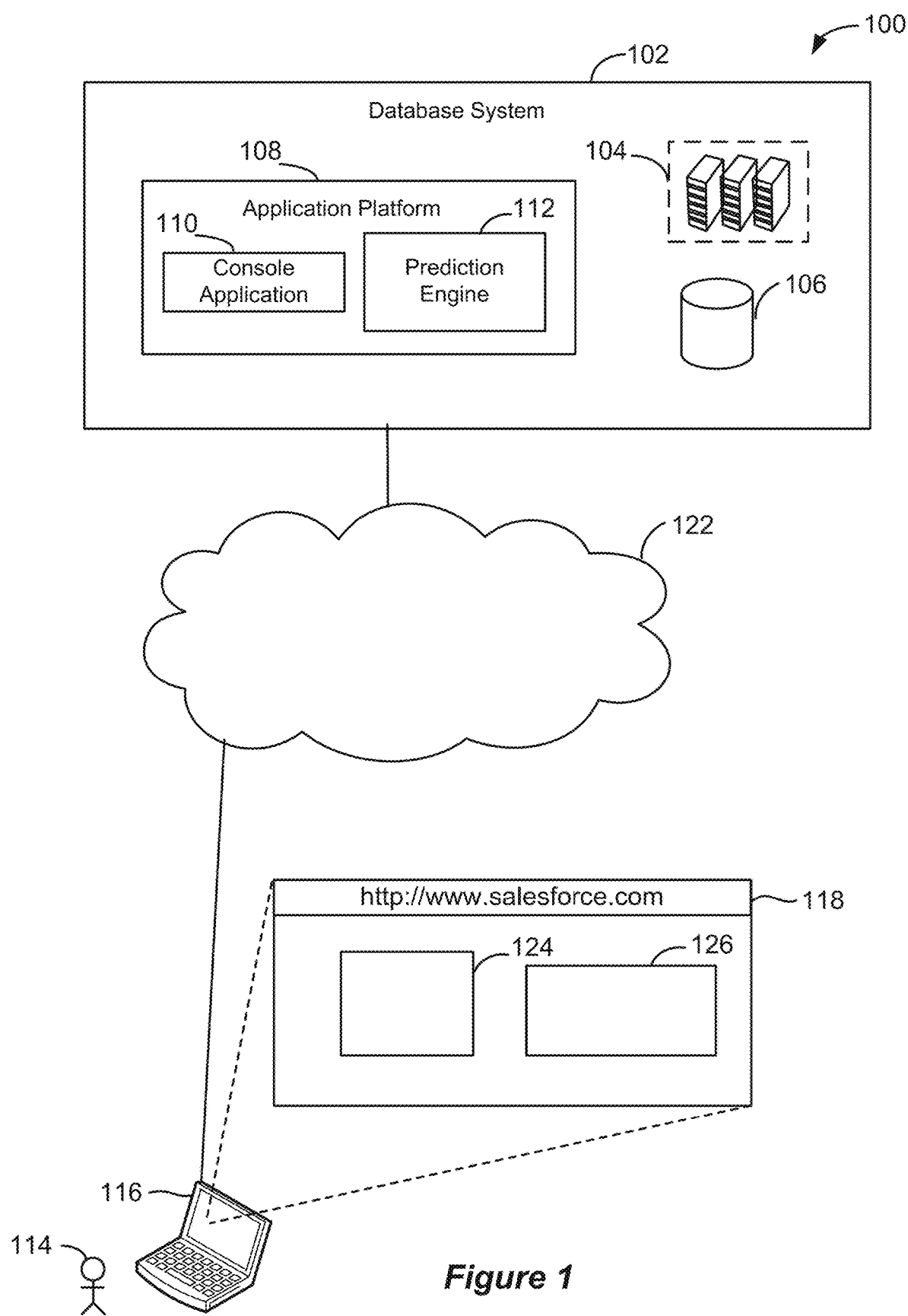
FIG. 1 shows a system diagram of an example of a system 100 in which a prediction engine may be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Various implementations described or referenced herein are directed to different methods, apparatus, systems, and computer program products for facilitating the prediction of future generation of types of data objects based upon factors including past growth in an on-demand service environment. In some implementations, the disclosed methods, apparatus, systems, and computer program products may be configured or designed for use in a multi-tenant database environment.

The disclosed implementations generally relate to generating predictions pertaining to future generation of various types of data objects available from a database system. Predictions for a particular type of data object may be performed based, at least in part, on past growth for that particular type of data object. The data that is used to determine past growth for the particular type of data object may include two different sets of data that correspond to two different periods of time during which data objects of the particular type have been generated. The sets of data may be obtained by filtering data obtained from one or more data sources based upon a set of criteria such as type of industry, geographic region, season, quarter, day of the week, month, and/or hour. The data can include data obtained and/or derived from data objects, metadata pertaining to data objects, and/or statistics pertaining to data objects.

In some implementations, the prediction engine determines, from each set of data, the number of objects of the particular type that were generated during the corresponding period of time. The prediction engine predicts the number of data objects of the particular object type that will be generated in a future period of time based, at least in part, upon the growth of the number of data objects between the two periods of time.

In some implementations, the prediction engine may incorporate additional factors and/or types of data in the predictions generated. Such factors can include, but are not limited to, the release of new products or services, campaigns, and/or timelines associated with individual or organizational tasks being implemented. Other types of data can include social data such as posts or tweets. In some implementations, the prediction engine may apply weights to incorporate these additional factors and/or types of data into the prediction process.

In some implementations, predictions pertaining to specific object types are presented via a dashboard interface. The dashboard interface may provide information pertaining to objects of specific object types available from a database system via a visual representation such as a chart (e.g., bar chart, pie chard), map, graph, table, or spreadsheet. The information may represent corresponding data objects, data obtained or derived from objects, metadata pertaining to data objects, and/or statistics pertaining to data objects.

In some implementations, the prediction engine is configurable by a user. More particularly, a user may configure the type of data object for which predictions are desired. In addition, the user may configure the criteria to be used to obtain and filter data associated with the type of data object for which predictions are being generated. The user may also configure the manner or format in which information pertaining to the type of data object is to be presented. This may include, for example, selection or configuration of a chart or graph via which information is to be presented.

In some implementations, a graphical user interface (GUI) provides user-selectable options to facilitate configuration of the prediction engine. User-selectable options can include data object types supported by the database system, criteria used to retrieve and/or filter data, type of visual representation used to present predictions generated by the prediction engine, and/or formatting options associated with the type of visual representation.

In some implementations, the database system is associated with a web site via which a dashboard interface is provided for display at a client device. Information presented via the dashboard interface may pertain to data objects that can be accessed via the web site, as described herein. In addition, the dashboard interface may enable a user to configure the prediction engine to generate predictions for a particular type of data object.

In some implementations, the database system is a customer relationship management (CRM) system. The data objects may be of various object types stored by the CRM system. Example object types include, but are not limited to, an Account, a Contact, a Lead, a Case, and Opportunity.

In some implementations, the prediction engine and dashboard interface operate within the context of an organization of users of a database system. More particularly, the database system may perform a query against sources that store data objects that can be accessed by users within the organization. The sources that are queried may include sources that are internal to the database system and/or sources that are external to the database system. In some instances, the sources, data objects or a portion thereof may be accessed only by users within the organization or selected users within the organization that have access rights to the database system, sources, or data objects.

In some implementations, the database system may query or filter data pertaining to data objects based, at least in part, on a user profile maintained by the database system. Contextual information and/or user input may also be applied to query or filter the data.

In some implementations, the database system monitors interactions of users within the organization and/or external to the organization with the web site, database records, or other entities. An interaction with a database record may include accessing (e.g., viewing) a web page that includes data obtained or derived from a database record, editing a database record, or creating a database record. Information pertaining to interactions of users with the web site or database records may be maintained in user profiles, database records, files, or other suitable data structures.

By interacting with a dashboard interface, a user may access predictions generated by the prediction engine. In addition, the prediction engine may be configured via the dashboard interface to generate predictions for different data object types according to user-specified configurations. The disclosed methods, apparatus, and systems are further configured to render interfaces or parts of interfaces in web browser processes running on client machines.

Predictions are often generated by extrapolating from historical data. However, predictions generated in this manner do not account for factors that may be specific to different types of data or industries. In addition, such predictions do not account for the complex relationships between events and their impact on the generation of data objects of various types.

In some implementations, a prediction engine is configured to generate predictions pertaining to the number of new objects to be generated of a particular object type. As a result, a user may access accurate predictions pertaining to the generation of objects of various object types with minimal time and effort. Moreover, the predictions may be input to further system processes implemented by the database system.

By way of illustration, John is a sales employee within a Sales group at an organization, Salesforce, Inc. John logs into a CRM application via his computing device and accesses a dashboard interface provided by the CRM application. John then accesses a web page provided by the dashboard interface that facilitates configuration of the prediction engine. The user interface rendered within a browser window includes a number of user-selectable options that each corresponds to a criterion that is user-selectable.

John submits user input via the user interface to configure the prediction engine. More particularly, John configures the prediction engine to generate a prediction for the number of new contacts (e.g., new customers) that will be generated by Salesforce in 2019. The criteria that are user-selectable include a type of industry and geographic region. Thus, John indicates that the type of industry is "software services" and the geographic region is "California."

Since the type of industry is "software services," the prediction engine generates predictions based upon the assumption that sales of software services vary on a quarterly basis. Thus, for each quarter, the prediction engine filters contact data records to identify two or more sets of data that were generated during the same quarter (e.g., first, second, third, or fourth quarter). More particularly, a first set of data may correspond to contact data objects generated during the first quarter of 2017 and a second set of data may correspond to contact data objects generated during the first quarter of 2018. The prediction engine then predicts the number of new contact data objects to be generated during the first quarter of 2019 based, at least in part, on the number of contact data objects generated during the first quarter of 2017 and the number of contact data objects generated during the first quarter of 2018. A bar chart representing the predicted growth for future generation of contact data objects is generated and provided for presentation by a client device.

FIG. 1 shows a system diagram of an example of a system 100 in which a prediction engine may be implemented, in accordance with some implementations. In FIG. 1, a tenant database system 102 associated with an organization includes any number of computing devices such as servers 104. The servers 104 are in communication with one or more storage mediums 106 configured to store and maintain relevant metadata used to perform some of the techniques disclosed herein, as well as to store and maintain relevant data and/or metadata generated by the techniques disclosed herein. In this example, storage mediums 106 include tenant data storage configured to store and maintain tenant data generated by or otherwise maintained by tenants of tenant database system 102. Tenant data can include, for example, database records corresponding to clients, accounts, contacts, orders, leads, opportunities, cases, etc. In addition, storage mediums 106 can include web pages and associated metadata such as corresponding Uniform Resource Locators (URLs). Storage mediums 106 can also store objects such as those described in, which may be accessed as described in further detail below. In some implementations, storage mediums 106 can include a user history database that stores records pertaining to user interactions of users with database system 102, user interactions of users with objects maintained by database system 102, and/or user interactions with other users of database system.

In some implementations, storage mediums 106 can include user profiles associated with users (and corresponding user accounts) of database system 102. Information maintained in a user profile of a user can include or indicate one or more of the following: preferences of the user, a role of the user within an organization of users of the database system, a group of users within the organization of users of the database system that includes the user, permissions associated with the user, a history of interaction of the user with one or more database records, ownership of one or more database records, a history of interaction of the user with user(s) within the organization of users of the database system, or a history of interaction of the user with one or more groups of users within the organization of users of the database system. Ownership of a database record can indicate, for example, creation of the database record, responsibility for the database record, and/or having exclusive rights to edit the database record.

In some implementations, the information maintained in a user profile may include personal information for an individual. The personal information can indicate characteristics of the individual. The characteristics may be explicitly specified by the individual and/or may be implicitly derived based upon behavior of the individual. For example, characteristics of the individual may include an age, gender, marital status, height, weight, hair color, level of education, political affiliation, online purchase history, and/or personality characteristics. The personal information can also indicate the individual's home address, work address, and/or contact information. For example, contact information can include a phone number and/or an electronic mail (email) address.

A user profile of a given user may be updated periodically and dynamically by the database system based upon interactions of the user with other users within the organization, interactions with database records of the database system, or interactions with the web site. The user profile may also be updated in response to a user-initiated update to the user profile. In some implementations, the user profile may be updated by a machine learning model.

Database system 102 also includes application platform 108. Application platform 108 of tenant database system 102 may be a framework that allows applications of the tenant database system 102 to run. For example, application platform 108 may include hardware and/or software, e.g., the operating system. In some implementations, application platform 108 supports the creation, managing and executing of one or more applications.

In this example, application platform 108 is configured to support the execution of a Console Application 110 such as a customer relationship management (CRM) application that enables client devices to access database records maintained in storage mediums 106. The CRM application is configured to respond to requests from client devices by providing web pages that can be downloaded by client devices. In addition, application platform 108 is configured to support the execution of a Prediction Engine 112 configured to predict the future generation of data objects of a specific data object type and provide results of the prediction for display by a client device, as described herein. Servers 104 may be configured to execute Prediction Engine 112. Servers 104 may also be configured to access data and/or metadata stored in storage mediums 106, external services offered by servers external to database system 102, and/or data maintained in storage mediums outside database system 102.

Storage mediums 106 may further store computer-readable instructions configured to perform some of the techniques described herein. In addition, the storage mediums 106 may store metadata, data, or other information received and/or generated by a tenant as described herein.

In some implementations, tenant database system 102 is also configured to store privilege information identifying or specifying access rights and restrictions of users according to various attributes such as a specified user ID, type of user, role of a user, a community or group to which the user belongs, and/or a particular organization on behalf of which a community is maintained. Each of the communities may be operated on behalf of an organization. Each organization may have associated therewith one or more tenants, which may each be associated with one or more communities.

The servers 104 may be associated with a network domain, such as www.salesforce.com and may be controlled by a data provider associated with the network domain. A user of client computing device 116 can have an account at Salesforce.com®. By logging into this account, the user can access the various services provided by servers 104.

In the following examples, it is assumed that a user 114 accessing Console Application 110 and prediction services offered by Prediction Engine 112 via client computing device 116 has access rights to prediction services offered by Prediction Engine 112, as described herein. More particularly, it is assumed that user 114 has permission to configure Prediction Engine 112 to access corresponding data or other information that is maintained in tenant storage for generating predictions. In addition, it is assumed that the user 114 has access rights to Console application 110. For example, in the following description, it may be assumed that user 114 has successfully logged in to Console Application 110.

During execution of Console Application 110, a web page 118 containing a prediction engine configuration interface 124 generated by Prediction Engine 112 may be downloaded to client computing device 116 via network 122. Upon downloading the web page 118, the web page 118 may be rendered by a web browser within a browser window of client computing device 116. A user may then interact with Prediction Engine 112 via prediction engine configuration interface 124, as will be described in further detail below.

Prediction engine configuration interface 124 can include a user interface object configured to receive user input in association with user-configurable criteria. In response to the user input, Prediction Engine 112 may store a prediction engine configuration for subsequent retrieval by Prediction Engine 112. The prediction engine configuration may be stored in association with an entity such as a user, group, or organization. Prediction Engine 112 may then generates prediction for a particular data object type according to the prediction engine configuration and the result of generation of the predictions may be presented via a visual representation 126 such as a chart or graph within web page 118 or another web page. In some implementations, Prediction Engine 112 may provide information pertaining to the predictions via other forms of media such as audio or video.

The client device 116 may be in communication with the data provider via network 122. More particularly, the web browser may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which the data network 122, servers 104, storage mediums 106, and/or possible additional apparatus and systems such as multi-tenant databases may all be considered part of the "cloud."

In some implementations, a customer relationship management (CRM) application may present a navigation interface that enables users to navigate within a corresponding web site and access data objects stored in storage mediums 106. The CRM application can provide a search or click-based mechanism such as tabs that facilitate access to data objects of various object types, which may be identified by the tabs. Prediction Engine 112 can be configured to access data objects stored in storage mediums 106 to generate predictions according to a prediction engine configuration pertaining to a CRM object type such as Contacts, Accounts, Leads, Opportunities, and/or Cases. Prediction Engine 112 can provide generated predictions pertaining to the CRM object type via a visual representation for display by a client device, as will be described in further detail below.

Data objects can include records stored in at least one database. Moreover, each data object may correspond to one of a plurality of types of data objects. Each type of data object may correspond to a particular category or sub-category of data. In addition, each type of data object may correspond to a particular database or database table. Thus, each type of data object may have associated therewith a corresponding set of fields for which data can be stored for data objects of that type.

In some implementations, object types correspond to types of database records or database tables maintained by a CRM application. For example, types of database records or database tables can include Accounts, Contacts, Leads, Opportunities, and/or Cases. In the following examples, predictions are generated for the object type, Contact. However, these examples are merely illustrative and predictions may be generated for other types of data objects.

Prediction Engine 112 may generate a GUI including a visual representation of predictions generated for a particular object type according to a prediction engine configuration. A visual representation may include, for example, a chart or graph. The visual representation may indicate the number of new data objects of a particular type of data object that are predicted to be generated for a corresponding period of time. In some implementations, predictions may be specific to a particular geographic region. The visual representation may also indicate the number of new data objects that have previously been generated for a corresponding period of time and/or geographic region. An example of such a visual representation will be described in further detail below with reference to FIG. 2.

Figure 2:
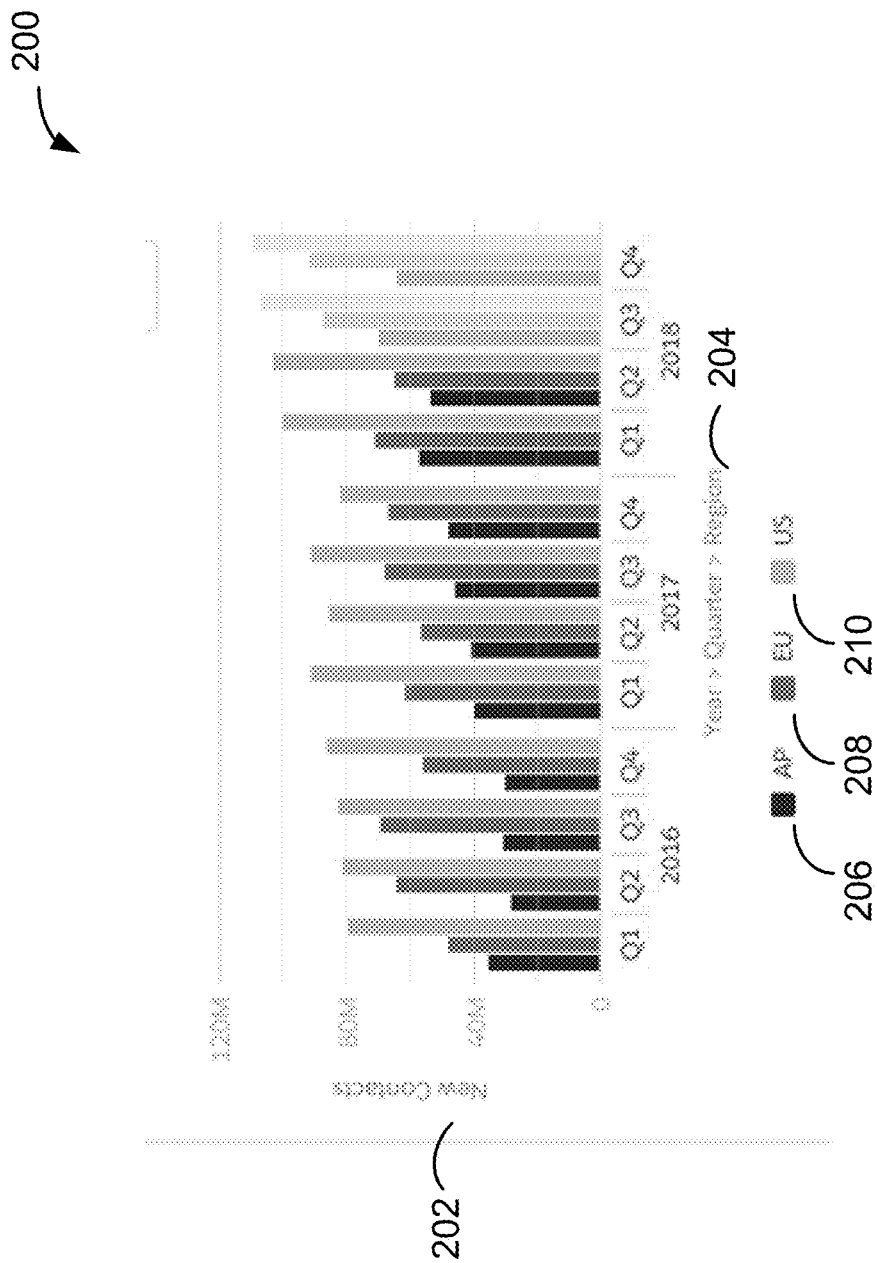
FIG. 2 shows an example of a graphical user interface (GUI) 200 including predictions generated for presentation on a display device of a client device in an on-demand database service environment, in accordance with some implementations.

FIG. 2 shows an example of a GUI 200 including predictions generated by a prediction engine for presentation on a display device of a client device in an on-demand database service environment, in accordance with some implementations. In this example GUI 200 is a bar chart that indicates the number of New Contacts 202 that have been generated or are predicted to be generated on the y-axis in relation to the Year, Quarter, and Region 204 indicated along the x-axis. In this chart, the regions are identified as Asia Pacific (AP) 206, Europe (EU) 208, and United States (US) 210. Thus, in this example, each period of time corresponds to both a year and a quarter.

Within the visual representation, information pertaining to data used to generate the predictions may be presented, as well as the predictions. As shown in FIG. 2, the chart indicates the number of new contact database records that have been generated during each of the four quarters Q1-Q4 of 2016 and 2017 and the first two quarters Q1, Q2 of 2018 for each of the geographic regions 206, 208, 210. In addition, the chart indicates the number of new contact database records that are predicted to be generated during the last two quarters Q3, Q4 of 2018 for each of the geographic regions 206, 208, 210. More particularly, predictions for Q3 of 2018 are generated based, at least in part, on data associated with Q3 of both 2016 and 2017, while predictions for Q4 of 2018 are generated based, at least in part, on data associated with Q4 of both 2016 and 2017. Therefore, GUI 200 indicates the number of new data objects of a particular type of data object that are predicted to be generated for a corresponding period of time and corresponding geographic region, It is important to note that the predictions are not generated via extrapolation. Rather, predictions may be generated based, at least in part, on a configuration of the Prediction Engine. As described above, predictions may be generated based, at least in part, on quantities of data objects for a particular data object type for two different time periods. Predictions may also be generated further based upon system rules, external data such as weather or social data, scheduled system processes, timelines associated with individual tasks, campaigns, previously implemented products or services, scheduled release of products or services, and/or weighting algorithms, as will be described in further detail below.

A configuration of the Prediction Engine may indicate various criteria that are used to obtain or filter data used to generate predictions. The configuration may include or be derived using a set of rules. In some implementations, the set of rules may be configured by a user via a GUI. In other implementations, the set of rules may be statically configured or may be implicit in the configuration.

A rule may include one or more operators such as AND, OR, NOT, =, >, or <. In addition, a rule may include conditional language such as IF or WHEN. Moreover, a rule may include language such as "MAX," "ALWAYS," or "AT LEAST." A set of rules may be associated with one or more tenants, an organization, a team, a user, and/or a particular context.

A rule may also include one or more operands. Each operand may be static or configurable. An operand may identify or correspond to a particular type of data object. In addition, an operand may include a variable corresponding to a plurality of user-selectable options. For example, the variable may correspond to a time period configuration, industry type configuration, or geographic region configuration. An operand may also correspond to a numerical value pertaining to a specific type of information obtained or derived from database records of a particular object type. Therefore, a rule or portion thereof may correspond to a particular object type.

In some implementations, criteria of the Prediction Engine are configurable by a user. Criteria that are configurable can include, but are not limited to, a type of data object for which predictions are to be generated, criteria indicating periods of time for which predictions are to be generated, and/or criteria indicating geographical region(s) for which predictions are to be generated. The criteria may be used to retrieve data that is used to generate the predictions. Examples of interfaces that may be rendered to facilitate configuration of the Prediction Engine will be described in further detail below with reference to FIGS. 3 and 4.

Figure 3:
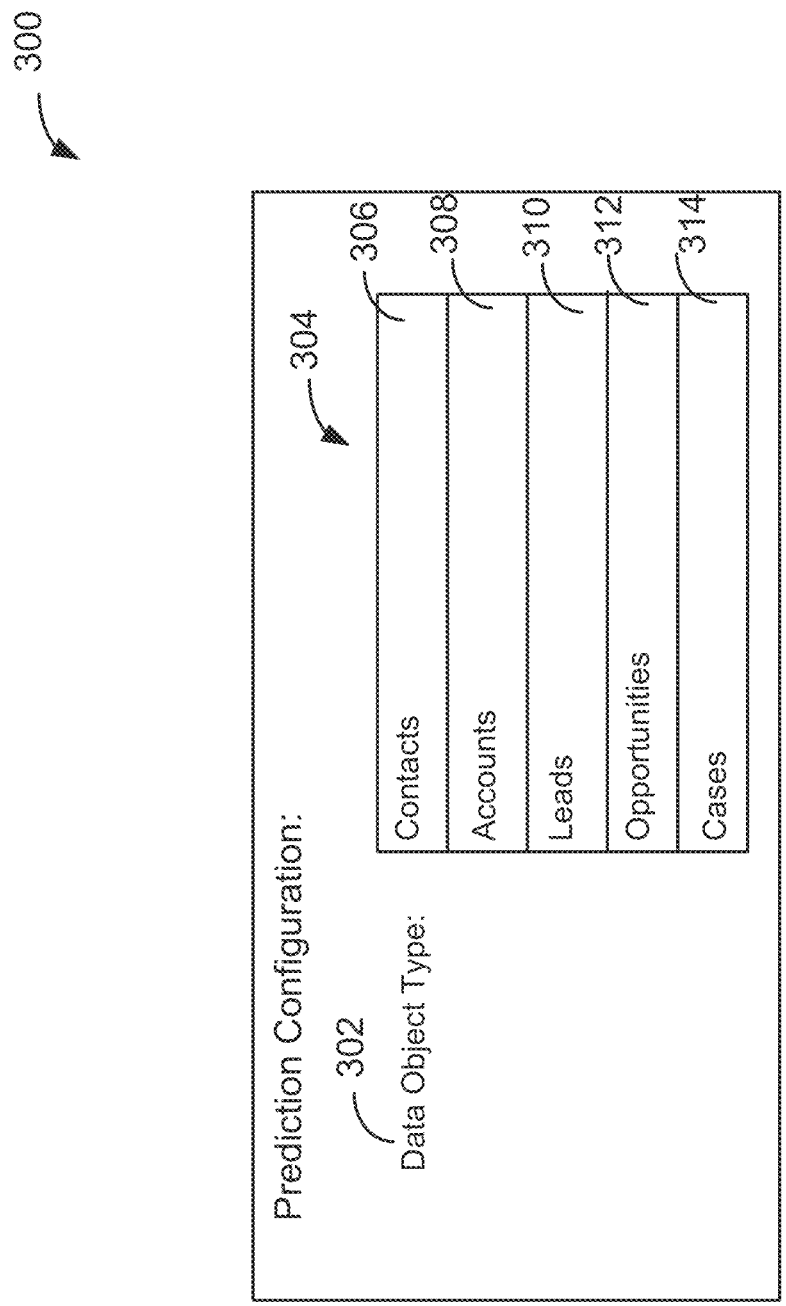
FIG. 3 shows an example of a GUI 300 including a data object type configuration interface generated for presentation on a display device of a client device in an on-demand database service environment, in accordance with some implementations.

In some implementations, the type of data object for which predictions are generated is configurable. FIG. 3 shows an example of a GUI 300 including a data object type configuration interface generated for presentation on a display device of a client device in an on-demand database service environment, in accordance with some implementations. More particularly, GUI 300 may enable a data object type 302 to be configured via a user interface object 304, which may include a menu, tabs, and/or a user input box. As shown in FIG. 3, user interface object 304 may provide a plurality of user-selectable options that each corresponds to a different data object type. In some implementations, the data object types correspond to types of data objects maintained by a CRM system. In this example, user interface object 304 provides a plurality of user-selectable options, where the user-selectable options include Contacts 306, Accounts 308, Leads 308, Opportunities 310, and Cases 312. A user selects the data object type, "Contacts" 306, and proceeds to complete configuration of the Prediction Engine.

Examples of additional criteria that may be configured in association with the Prediction Engine are described in further detail below with reference to FIG. 4. While specific criteria and user-selectable options are shown in these examples, it is important to note that these criteria and user-selectable options are merely illustrative. In addition, any number of criteria and/or user-selectable options may be presented separately or in combination with one another.

Figure 4:
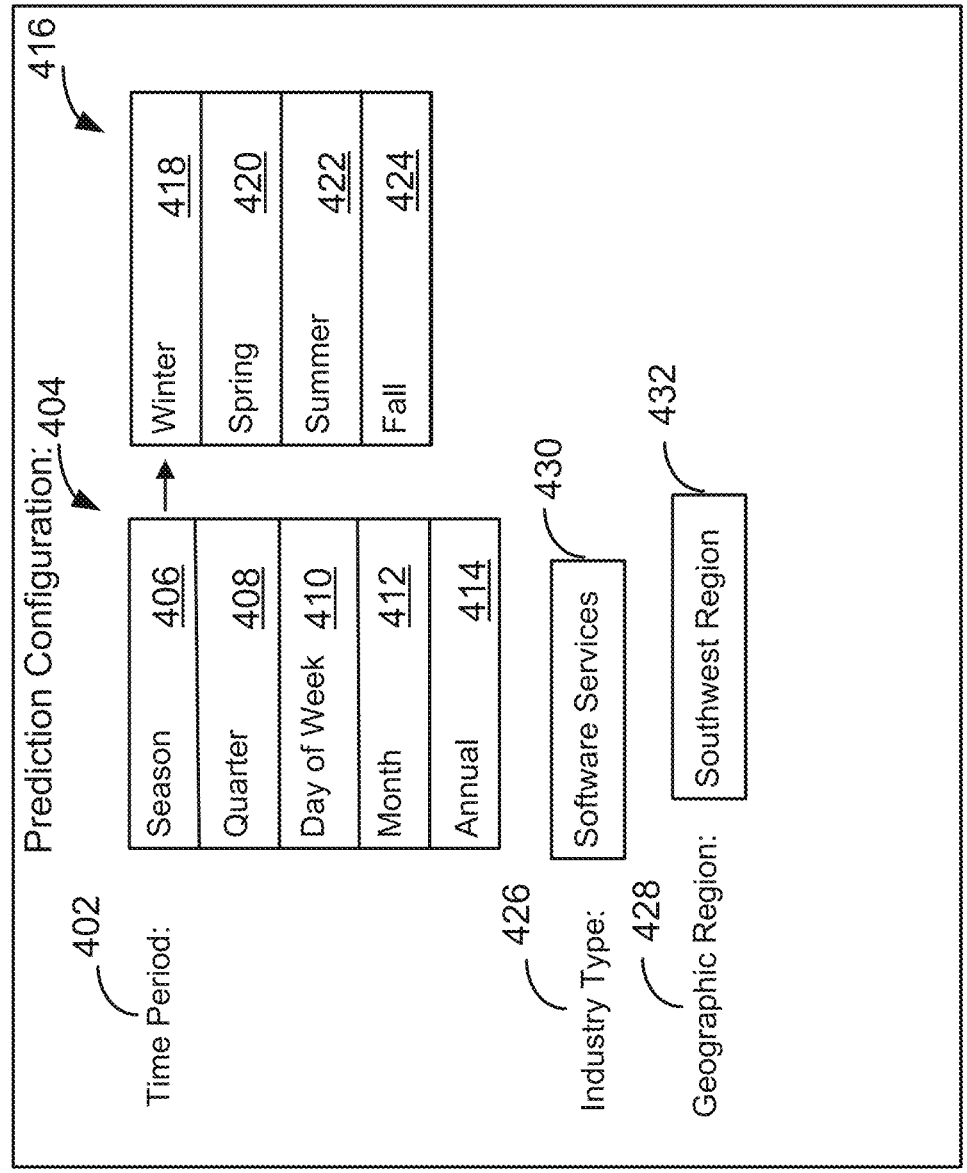
FIG. 4 shows an example of a GUI 400 including a prediction configuration interface generated for presentation on a display device of a client device in an on-demand database service environment, in accordance with some implementations.

FIG. 4 shows an example of a GUI 400 including a prediction configuration interface generated for presentation on a display device of a client device in an on-demand database service environment, in accordance with some implementations. More particularly, GUI 400 may enable time period criteria 402 to be configured via a user interface object 404, which may include a menu, tabs, and/or a user input box. As shown in FIG. 4, user interface object 404 may provide a plurality of user-selectable options that each corresponds to a different time period criteria. In this example, user interface object 404 provides a plurality of user-selectable options, where the user-selectable options include Season 406, Quarter 408, Day of Week 410, Month 412, and Annual 414. A user selects "Season" 406 and proceeds to complete configuration of the Time Period criteria 402.

In some implementations, upon selection of a user-selectable option, a further user interface object may be presented to enable the user to further define the specific criteria to be applied by the Prediction Engine. For example, where the user selects the Day of Week 410 option, a further user interface object may present days of the week for selection by the user.

As shown and described in this example, Time Period Criteria 402 may be configured such that it may be used for multiple future predictions. In other words, Time Period Criteria 402 does not specify specific time periods for which data is to be obtained or predicted.

In this example, in response to selection of "Season" 406, the user may further select a specific season for which predictions are desired. As shown in this example, an additional user interface object 416 including a menu may be presented in association with the criteria 402. User interface object 416 may further provide a plurality of user-selectable options for corresponding sub-criteria. In this example, the user-selectable options include Winter 418, Spring 420, Summer 422, and Fall 424. The user may choose one of the user-selectable options. Alternatively, the user may choose not to select one of the user-selectable options.

For a given criteria or sub-criteria, a user may select one or more user-selectable options. Where a user chooses not to select one of the user-selectable options for a particular sub-criteria (e.g., Season), the system may apply a set of default rules that results in the configuration including all of the available options for that sub-criteria. Alternatively, in the instance where a user chooses not to select one of the user-selectable options for a particular criteria (e.g., Industry Type), the system may apply a set of default rules that results in the exclusion of that particular criteria from the configuration.

For example, suppose that the user chooses not to select one of the provided options 418, 420, 422, 424 for Season sub-criteria 406. In this instance, the system may generate predictions using data obtained for all seasons over two or more years. Specifically, the system may, for each season, generate predictions based upon data corresponding two or more years for that season. If the user chooses to select a specific season, predictions may be generated by the system for only that season using data corresponding to two previous years for only that season. Therefore, by enabling a user to configure Prediction Engine 112 to use only a subset of the data stored in association with a particular object type, the system may conserve memory and processing resources that would otherwise be consumed using traditional schemes.

In some implementations, one of the user-selectable options presented for a given criteria or sub-criteria may be "None," "N/A," or "All." By selecting one of these user-selectable options, the user can explicitly exclude a criteria or sub-criteria from the configuration or include all of the user-selectable options for a given criteria or sub-criteria. For example, by selecting the option "None," the user may exclude the corresponding criteria or sub-criteria from the configuration. As another example, by selecting the option "N/A" or "All," the user may include all of the user-selectable options for that criteria or sub-criteria in the configuration.

In this example, GUI 400 further presents criteria including Industry Type 426 and Geographic Region 428. In this example, the user has selected user-selectable option "Software Services" 430 in association with Industry Type 426. In addition, the user has selected use-selectable option "Southwest Region" 432 in association with Geographic Region 428.

FIG. 4 illustrates examples of criteria and sub-criteria that may be configured by a user. However, these examples are merely illustrative. Thus, additional and/or different criteria/sub-criteria or may be presented with corresponding user-selectable options.

For example, the criteria can include "Social," where the user-selectable options enable a user to select the types of social data that is to be accessed and applied by the Prediction Engine to generate predictions. The types of social data can include an identifier of or link to a specific social website or social networking system from which data is to be retrieved, an identifier or link to a specific user profile on the social website for which data is to be retrieved, and/or an indication of a type of communication (e.g., tweets, feeds, posts) from which data is to be retrieved.

In some implementations, a user may elect to incorporate additional factors and/or types of data into the prediction algorithm implemented by the Prediction Engine. Such factors can include, but are not limited to, information pertaining to a previous or scheduled release of new products or services, previous or scheduled campaigns, and/or timelines associated with individual or organizational tasks that have been implemented or are scheduled to be implemented. For example, information pertaining to a product or service that has been released or is scheduled to be released may include the date of release and/or characteristics of the product or service. Other types of data can include social data such as posts or tweets.

Additional factors and/or types of data may be selectable by a user from user-selectable options presented via corresponding user interface object(s). In some implementations, the user may assign weights to the various factors and/or types of data (including the particular type of data object for which the predictions are generated). For example, a user interface object may include a user input box and/or user-selectable options that enable the user to select or specify a weight indicating a percentage associated with each factor and/or type of data. The prediction engine may then apply these weights to incorporate these additional factors and/or types of data into the prediction process.

In some implementations, the criteria and/or sub-criteria that are presented in association with user configuration of the Prediction Engine are customizable. For example, an administrator of a sports venue may generate additional criteria such as "Weather." As another example, where criteria Industry Type 426 has associated therewith a user-selectable option "Restaurants," an administrator of a restaurant chain may choose to generate additional sub-criteria such as "Restaurant Types" and "Restaurant Price Ranges." Therefore, criteria and/or sub-criteria that may applied by the Prediction Engine to filter data and generate predictions may be generated via a user interface object and stored in association with the criteria of the Prediction Engine.

In some implementations, the user-selectable options presented in association with user configuration of the Prediction Engine may be customizable for a given criteria or sub-criteria. For example, an administrator employed by a restaurant chain may configure the data object types that are selectable to include data object types that are specific to the restaurant industry. Therefore, user-selectable options presented via a user interface object such as those described above with reference to FIG. 3 and FIG. 4 may be configured by an individual.

In some implementations, the Prediction Engine may generate the configuration further based upon a set of default rules. For example, where an administrator of a restaurant chain selects "Industry Type" as "Restaurant" and subsequently selects "Pizza" for sub-criteria "Restaurant Category," the system may assume that the time period is specific to the "Day of Week" 410 and store the configuration accordingly. As a result, predictions may be generated, for each day of the week, using data that corresponds solely to that day of the week. In addition, the selection of an option for a criteria or sub-criteria may result in the exclusion of other criteria or sub-criteria from GUI 400. For example, where the user selects "Pizza" for sub-criteria "Restaurant Category," Prediction Engine may exclude "Time Period 402" from the available criteria that are configurable by a user.

In some implementations, the type of visual representation and/or formatting used to present the predictions generated by the Prediction Engine may be configurable by a user. For example, the user may select the type of chart, graph, or other visual representation that will be used to present the predictions. The user may also choose formatting options such as colors, types of lines or shading, text, and/or fonts that may be used to visually represent different types of information. For example, the user may configure the visual characteristics used to present information associated with a particular region or time period criteria.

In some implementations, permissions may be established in association with the Prediction Engine. The permissions may limit access to generating or modifying a configuration of the Prediction Engine to specific individuals, users within a particular group within an organization, or users having specific roles within the organization.

Upon generating a configuration or modifying an existing configuration, the configuration may be stored for later retrieval by the Prediction Engine. The configuration may be stored in association with an organization, group within the organization, or user within the organization. The organization may be associated with one or more tenants of a multi-tenant database system.

The Prediction Engine can access data from one or more data sources including databases storing data objects according to the configuration. The Prediction Engine can then process the data to generate and present predictions, as further described below.

The data that is retrieved by the Prediction Engine may be limited to the data that is pertinent to the configuration. For example, where the specific type of data object associated with configuration is "Contacts," the Prediction Engine may only retrieve database records of the type of data objects "Contacts." Alternatively, the data that is retrieved may be filtered according to the configuration.

Each type of data object may have an associated set of fields for which data is stored for data objects of that type. More particularly, each type of data object may correspond to database records having a corresponding set of fields specific to that type of data object. An example database record will be described in further detail below with reference to FIG. 5.

Figure 5:
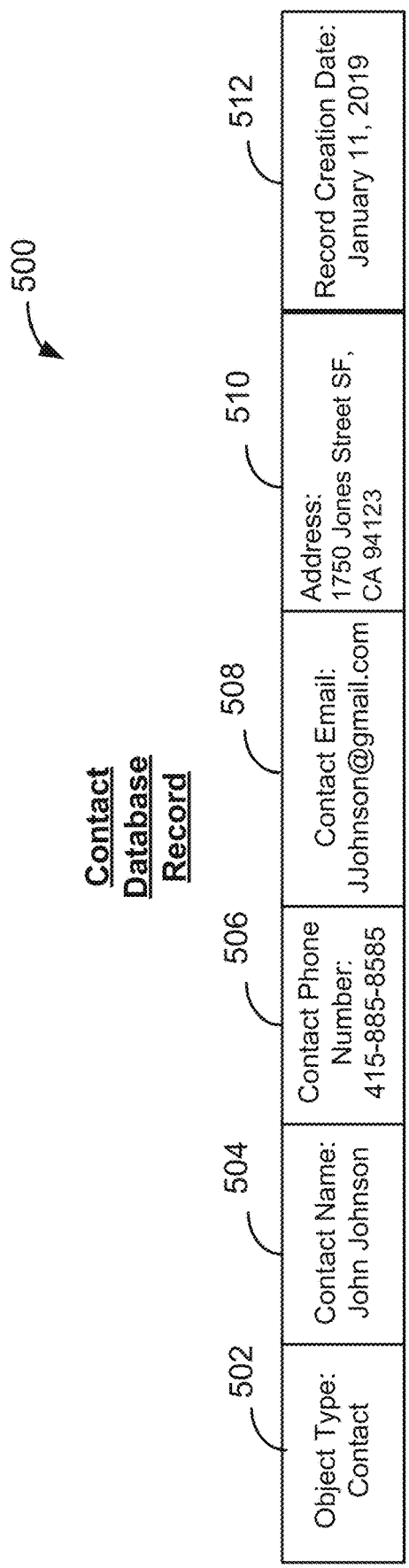
FIG. 5 shows an example of a database record 500 generated and stored in an on-demand database service environment, in accordance with some implementations.

FIG. 5 shows an example of a data object 500 generated and stored in an on-demand database service environment, in accordance with some implementations. In accordance with various implementations, data object 500 is a database record. In this example, data object 500 is a Contact database record. However, it is important to note that this example is merely illustrative and a variety of types of data objects may be stored and accessed, as described herein.

As shown in FIG. 5, a data object may include an Object Type field 502 that identifies the type of data object. In this example, the type of data object is a Contact database record. In other implementations, the type of data object may be ascertained based upon the database or database table that corresponds to the type of data object.

The data object can include further fields such as Contact Name field 504, Contact Phone Number field 506, Contact Email field 508, and/or Contact Address field 510. Other types of data objects may have different fields associated therewith.

In accordance with various implementations, each data object includes a Record Creation Date field 512 that indicates a date that the data object was created. For example, the value stored in the Record Creation Date field 512 of a database record may indicate the date that the database record was generated and stored within a database. The value of the Record Creation Date field 512 may be accessed by the Prediction Engine to retrieve and/or filter database records to identify or obtain a set of database records that were generated within a particular time period.

In some implementations, the Prediction Engine accesses or obtains database records of the particular type of data object indicated in the configuration, obtains data from one or more fields (e.g., Record Creation Date) of the database records, and stores the data or information derived therefrom in a data structure such as a table. For example, information for the database records may be organized alphabetically according to values of one or more fields of the database records.

In some implementations, the data is stored in the form of a table that includes a "list" of data objects such as database records. FIG. 6 shows an example of a list of Contact database records 600 generated and stored in an on-demand database service environment, in accordance with some implementations. In this example, the list or table includes columns representing fields of the database records of the pertinent object type, while each row represents a different database record of the pertinent object type. The list or table may include, for each of the database records, values for at least a subset of the fields for the corresponding type of data object.

In this example, columns of the table correspond to database record fields of the object type, "Contact." More particularly, columns correspond to database record fields including Contact Name 602, Contact Phone Number 604, Contact Email 606, Contact Address 608, and Contact Record Creation Date 610. Each row of the table corresponds to a different Contact database record.

In many instances, the system may maintain two different records for the same entity or individual. In this example, John Johnson is identified as John Johnson in one database record and Jonathan Johnson in another database record, as shown at 612 and 614, respectively.

In some implementations, de-duplication is performed to eliminate duplicate data prior to processing the data. A data structure such as that shown in FIG. 6 may be used to identify duplicate data objects. To identify duplicate data objects, the data objects identified in the data structure may be sorted according to alphabetical or alphanumeric order, for example. Where two different data objects have a similar value for a particular field, value(s) for one or more additional fields of the data objects may be compared to determine whether the data objects correspond to the same entity. For example, two different Contacts having similar identifiers (e.g., Contact Name field values) may be processed to determine whether the Contacts correspond to the same entity. For example, values of the Contact Phone Number, Contact Email, and/or Contact Address fields may be compared to ascertain whether the values are identical. Where the values are determined to be identical, the Prediction Engine may conclude that the corresponding data objects represent the same entity. In this manner, de-duplication may be performed to identify duplicate data records and consolidate the duplicate data records or information associated therewith so that the entity is represented by a single record and/or represented a single time within the data structure.

Figure 7:
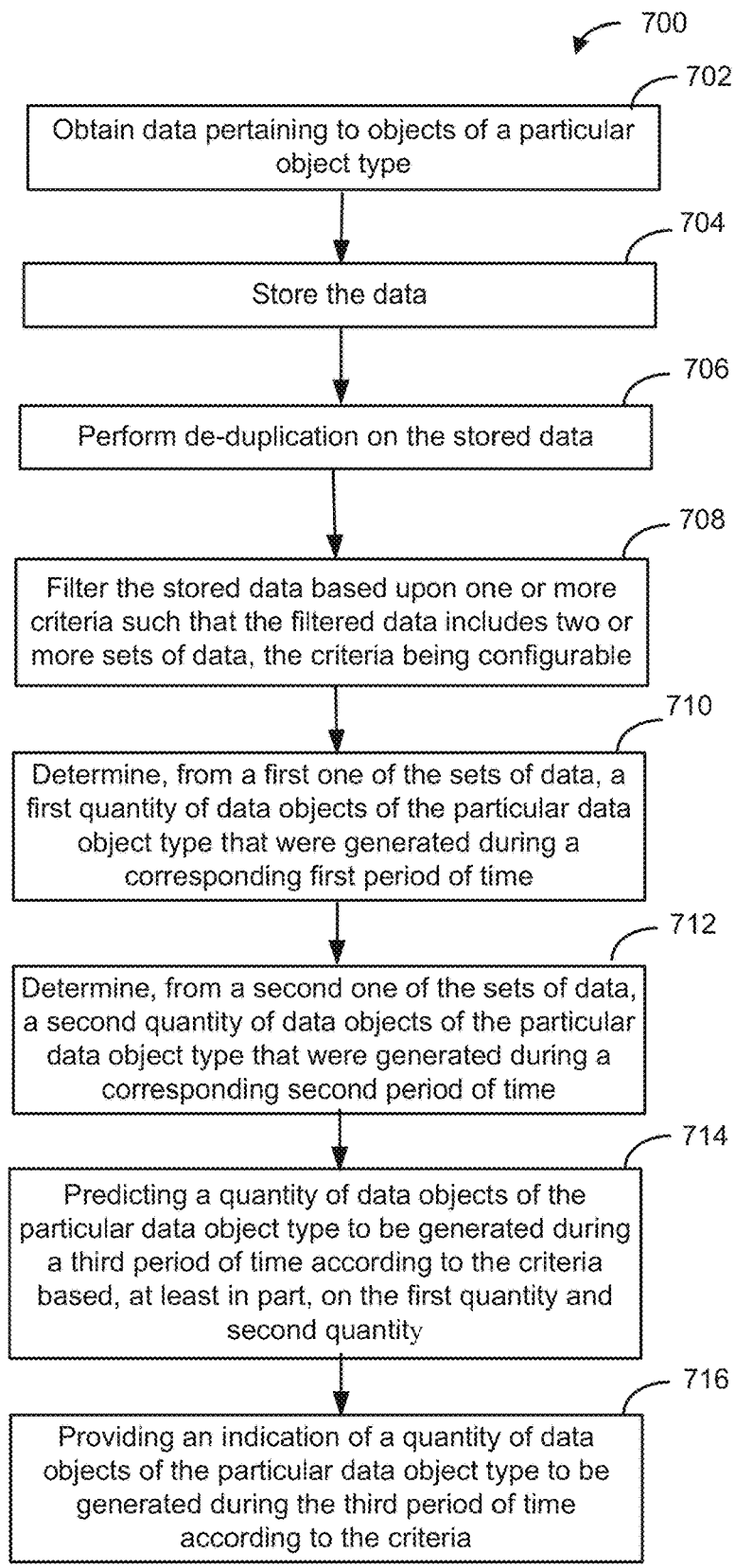
FIG. 7 shows a flow diagram of a method 700 for providing data object type predictions for presentation on a display device of a client device in an on-demand database service environment, in accordance with some implementations.

FIG. 7 shows a flow diagram of a method 700 for providing data object type predictions for presentation on a display device of a client device in an on-demand database service environment, in accordance with some implementations. The Prediction Engine of a Database System may generate and provide predictions automatically (e.g., periodically). For example, the Prediction Engine may be configured to generate and provide predictions on a quarterly basis on the last day of the quarter. Alternatively, the Prediction Engine of a Database System may generate and provide predictions dynamically in response to a user request received from a client device.

As shown in FIG. 7, the prediction engine may obtain data from one or more data sources, where the data pertains to data objects of a particular data object type (702). As described above, the particular data object type may be identified from a configuration of the Prediction Engine. The Prediction Engine may store the data in at least one storage medium (e.g., memory) (704).

In some implementations, the Prediction Engine retrieves data from one or more data sources that are external to the database system. For example, where the criteria that are applied by the Prediction Engine include weather, the Prediction Engine may access weather data from a weather service so that the weather on previous days may be determined and the weather forecast for future days may be ascertained. As another example, where the criteria that are applied by the Prediction Engine indicate a particular type of social data, the social data may be accessed via the corresponding social website or social networking system.

Prior to processing the data, the Prediction Engine may perform de-duplication on the stored data to remove duplicate data from the stored data (706). De-duplication may be performed according to a set of rules that is specific to the type of data object. The set of rules may be statically or dynamically configured. In some implementations, the set of rules is configurable by a user.

The set of rules may identify the specific fields used to identify duplicate data records, the order in which values of the fields are applied, and/or the manner in which the values of the fields are applied. For example, the set of rules may indicate that for the data object type, Contact, the field Contact Name is to be used to identify Contacts having a similar name. A similar name may be identified, for example, using name equivalents such as John and Jonathan. In addition, a similar name may be identified where a sequence of characters in two different Contact database records is identical, where the sequence of characters contains a number of characters that exceeds a threshold number. The set of rules may further indicate that the field(s) Contact Phone Number and/or Contact Address is to be subsequently used to determine whether the Contact database records contain the same phone number in the Contact Phone Number field or the same address in the Contact Address field.

After performing de-duplication on the stored data, the Prediction Engine may filter the stored data based, at least in part, upon one or more criteria, where the criteria are configurable (708). More particularly, the previously stored configuration of the Prediction Engine, including the criteria (e.g., configured values), may be applied such that filtered data includes two or more sets of data, where each of the sets of data pertains to the particular data object type and corresponds to a different period of time. As described above, the periods of time for which each of the sets of data is obtained are not user-specified. Rather, the periods of time may be determined by the Prediction Engine based, at least in part, on the criteria. Each of the sets of data represents data objects of the particular data object type that were generated during the corresponding period of time. The criteria may include, but are not limited to: type of industry, geographic region, and/or time period criteria such as season, quarter, day of the week, or month. For example, the criteria may indicate that the predictions are to be generated based upon data pertaining to the first quarter of the year.

The Prediction Engine may determine, from a first one of the sets of data, a first quantity of data objects of the particular data object type that were generated during a corresponding first period of time (710). For example, the Prediction Engine may determine that 3000 Contact data objects were generated during the first quarter of 2017.

In addition, the Prediction Engine may determine, from a second one of the sets of data, a second quantity of data objects of the particular data object type that were generated during a corresponding second period of time that is subsequent to the first period of time (712). For example, the Prediction Engine may determine that 10000 Contact data objects were generated during the first quarter of 2018.

The Prediction Engine may then predict a quantity of data objects of the particular data object type to be generated during a third period of time according to the criteria based, at least in part, on the first quantity of data objects of the particular data object type generated during the first period of time and the second quantity of data objects of the particular data object type generated during the second period of time (714). The third period of time may be ascertained based, at least in part, on the criteria. For example, the third period of time may be the first quarter of 2019.

While the predictions are generated in this example based upon two different quantities of data objects generated during two different periods of time, this example is merely illustrative. Therefore, predictions may also be generated based upon more than two different quantities of data objects generated during corresponding periods of time, as described herein.

Predictions may be generated based, at least in part, on a ratio or percentage change from the first quantity to the second quantity. In accordance with various implementations, data pertaining to criteria that have not been selected by a user or are not identified in the configuration is not used to generate the predictions. For example, data pertaining to the second, third, and fourth quarters of the year may not be used to generate predictions. In other words, the quantity of data objects of the particular data object type to be generated during a third period of time may be determined without obtaining or processing data that corresponds to criteria that have been excluded from the configuration by a user during the configuration process. Therefore, predictions may be generated while minimizing the amount memory and processing resources that are consumed during the prediction process.

Predictions may be generated according to an algorithm that incorporates additional factors and/or types of data. For example, the algorithm may incorporate data from external data source(s), specific types of data such as weather data or social data (e.g., tweets, posts, or feeds from specific social websites or social networking systems), campaigns, products or services that are newly released or scheduled to be released, and/or scheduled system processes or individual tasks having associated timelines.

In some implementations, the algorithm may incorporate additional features that are user-configurable. For example, the meaning associated with a particular term of a tweet, post, or feed may be interpreted according to user-configurable tuning parameters. A tuning parameter may, for example, indicate that the meaning associated with the term "Cancer" is neutral rather than negative. As another example, where the organization provides weight loss services, the term "weight loss" may be tuned such that it is interpreted as positive. Terms having a positive meaning may be identified, counted, and weighted according to a particular weight that is associated with positive terms.

In some implementations, the prediction engine may apply weights to incorporate these additional factors and/or types of data into the prediction process. Weights may be assigned to the sets of data and the additional factors, as described herein. For example, weights may be assigned to specific external data sources or types of data. As another example, weights may be assigned to represent the impact of a campaign, product, service, or scheduled process/task. The weights may be assigned by a set of default rules, a user configuration of the Prediction Engine, and/or a computer-generated model.

For example, the Prediction Engine 112 may generate a predicted number of data objects of the particular object type based upon a plurality of variables/parameters, where each of the parameters has an associated weight. Each of the parameters may represent a corresponding one of a plurality values used to generate the prediction. More particularly, the parameters can include a first parameter representing the number of data objects of the particular object type generated during the first period of time and a second parameter representing the number of data objects of the particular object type generated during the second period of time. Additional parameters can include, for example, a parameter representing social data such as the number of individuals generating tweets or posts that contain a particular term during a particular period of time, the number of tweets or posts generated by the individuals during the particular period of time, the number of followers of each of the individuals, the number of the individuals that became contacts during the particular period of time, the number of the individuals having a particular set of characteristics, the number of the individuals that became contacts during the particular period of time and also have a particular set of characteristics, and/or the total number of individuals having a particular set of characteristics that became contacts during the first and second periods of time.

In some implementations, Prediction Engine 112 may generate the predictions using variables and corresponding weights, as described above. A computer-generated model may generate the predictions and/or be applied to generate or modify the weights based, at least in part, on information indicating accuracy of the predictions that are provided. For example, the actual quantity of Contact data objects generated during the first quarter of 2019 may be ascertained by the Prediction Engine and used to update the weights that may subsequently be applied for that particular configuration. The configuration and/or computer-generated model may be associated with a particular type of data object, a particular organization, a particular group within the organization, and/or a particular individual.

The Prediction Engine 112 may provide an indication of the quantity of data objects of the particular data object type predicted to be generated during the third period of time according to the criteria (716). As described herein, the Prediction Engine may provide a visual representation such as a chart or graph. The visual representation may also indicate the quantity of data objects of the particular data object type that were generated during previous periods of time according to the criteria. For example, the visual representation may include a graph or chart such as that represented in FIG. 2, where the chart includes an indication of the quantity of Contact database records generated or predicted to be generated during each of the four quarters of the year, for each of the geographic regions indicated in the criteria. This enables a user to easily visually assess the amount of past growth for the creation of data objects of the particular type of data object, in addition the predicted amount of growth in the creation of data objects of the particular type of data object.

In some implementations, the Prediction Engine 112 also generates and provides predictions indicating the type of individuals predicted to become Contacts of the organization during the third period of time. More particularly, the Prediction Engine may retrieve and analyze the contents of the user profiles of individuals identified in the Contact database records in the first and second sets of data. Based, at least in part, on the user profiles, the Prediction Engine may identify the differences between user characteristics of the individuals identified in the first set of data and user characteristics of the individuals identified in the second set of data. Based upon these differences, the Prediction Engine may identify trends in the types of individuals for which new Contact database records are increasing, as well as the types of individuals for which new Contact database records are decreasing. Based upon these trends and the rate of growth (or decline) in new Contact database records for individuals having specific user characteristics, the Prediction Engine may predict the characteristics of individuals that are predicted to become contacts. The Prediction Engine may also ascertain and provide an indication of the percentage of new Contacts predicted to have a particular set of user characteristics. Therefore, the Prediction Engine 112 may facilitate the prediction of the quantity and/or qualities of new data objects of a particular data object type to be generated based upon past generation of data objects of the particular data object type In some implementations, predictions as to the characteristics of individuals that will become contacts may be generated in a similar manner to predictions related to the quantity of the contacts to be generated. For example, variables may correspond to individual characteristics, where each of the variables has a corresponding weight. As described above, predictions may be facilitated using a computer-generated model.

The predictions pertaining to the types of individuals predicted to become Contacts may be provided within the same visual representation presenting contact growth information or another visual representation such as a graph or chart. For example, each different group of individuals having different corresponding sets of characteristics may be represented by a corresponding color or shading pattern.

In some implementations, the Prediction Engine may ascertain and/or provide an indication of the degree (e.g., percentage) of accuracy of the predictions. For example, the actual number of contacts generated or the characteristics of those contacts may be compared to the predictions that were previously generated to ascertain a probable accuracy of the predictions generated by the Prediction Engine 112. The degree of accuracy of the predictions may be ascertained based, at least in part, on previous predictions for a particular data object type and actual data corresponding to the time periods for which predictions were generated for that object type.

In some implementations, the Prediction Engine 112 may update the weights used to generate the predictions based, at least in part, on the degree of accuracy of the predictions. For example, the Prediction Engine 112 may apply a computer-generated model to generate the predictions and update the weights of the computer-generated model accordingly.

Visual representation(s) rendered within a browser window can include information derived, at least in part, from data obtained from a data provider (e.g., the organization), as described herein. In some implementations, the type of visual representation and/or formatting used to present the predictions may be configurable by a user. Thus, the configuration that is stored and used to generate and present the predictions may identify the particular type of visual representation selected and/or the formatting used to render the visual representation.

Some implementations may incorporate various technologies for constructing pages. For example, one or more components or pages may be constructed using Lumen, Ext, ExtJS, Flex, and/or VisualForce™ technologies available from Salesforce.com®. As another example, one or more components or pages may be constructed using Flash, Ajax, HTML, JavaScript®, or other publicly available technologies.

In some implementations, one or more technologies developed by Salesforce.com®, such as the Web Services API, VisualForce™, and/or Apex Service-oriented Architecture ("SOA") may be used to display and/or integrate disparate data sources from across multiple systems. The apparatus and methods described herein may be designed or configured for use with various web browsers, such as IE 7+, Firefox 3.5+, Safari, etc.

In some implementations, performance may be improved by optimizing pages for high performance in a browser environment. Some web analytics and/or online business optimization platforms such as Omniture® may be used to measure the performance and adjust it as needed. In some embodiments, a network operations center ("NOC") may be used to monitor performance and react quickly to performance degradation.

Ext is a JavaScript® platform developed by Salesforce.com® that includes a broad variety of UI components that can be used to develop highly interactive browser UIs. Ext may allow a complex layout. It also has a well-defined event model which facilitates component communication. JavaScript components may be created by subclassing Ext's components.

In some implementations, some or all of the content viewable through the service cloud console will be inside of HTML iframes. The content included inside HTML iframes may include, but is not limited to: detail/edit pages, enhanced list views, customer and Salesforce®-created VisualForce™ pages and any random sites that customers put into custom links. HTML iframes may be useful because they may facilitate putting content of multiple detail/edit pages on the same browser page. Without iframes, for example, there may be conflicting ids and/or broken JavaScript®.

In some implementations, the client machine may communicate with a server via Ajax. The workspace context panel may display a layout-driven grid of fields from the detail page to the user. The HTML for these fields may differ from that in the Detail page because, for example, some complex elements (e.g., lookup) may have specific HTML IDs and output JavaScript® that references those HTML IDs. In order to reconstruct those elements and reassign HTML IDs to redisplay them, the workspace context panel may request the HTML for its fields from a servlet that resolves the HTML ID and JavaScript® issues.

While the present embodiments are described with reference to an on-demand service environment capable of supporting multiple tenants, these embodiments are not limited to multi-tenant databases or deployment on application servers. Embodiments may be practiced using other database architectures, for instance, ORACLE®, DB2® by IBM, and the like without departing from the scope of the embodiments claimed.

Techniques described or referenced herein can be implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
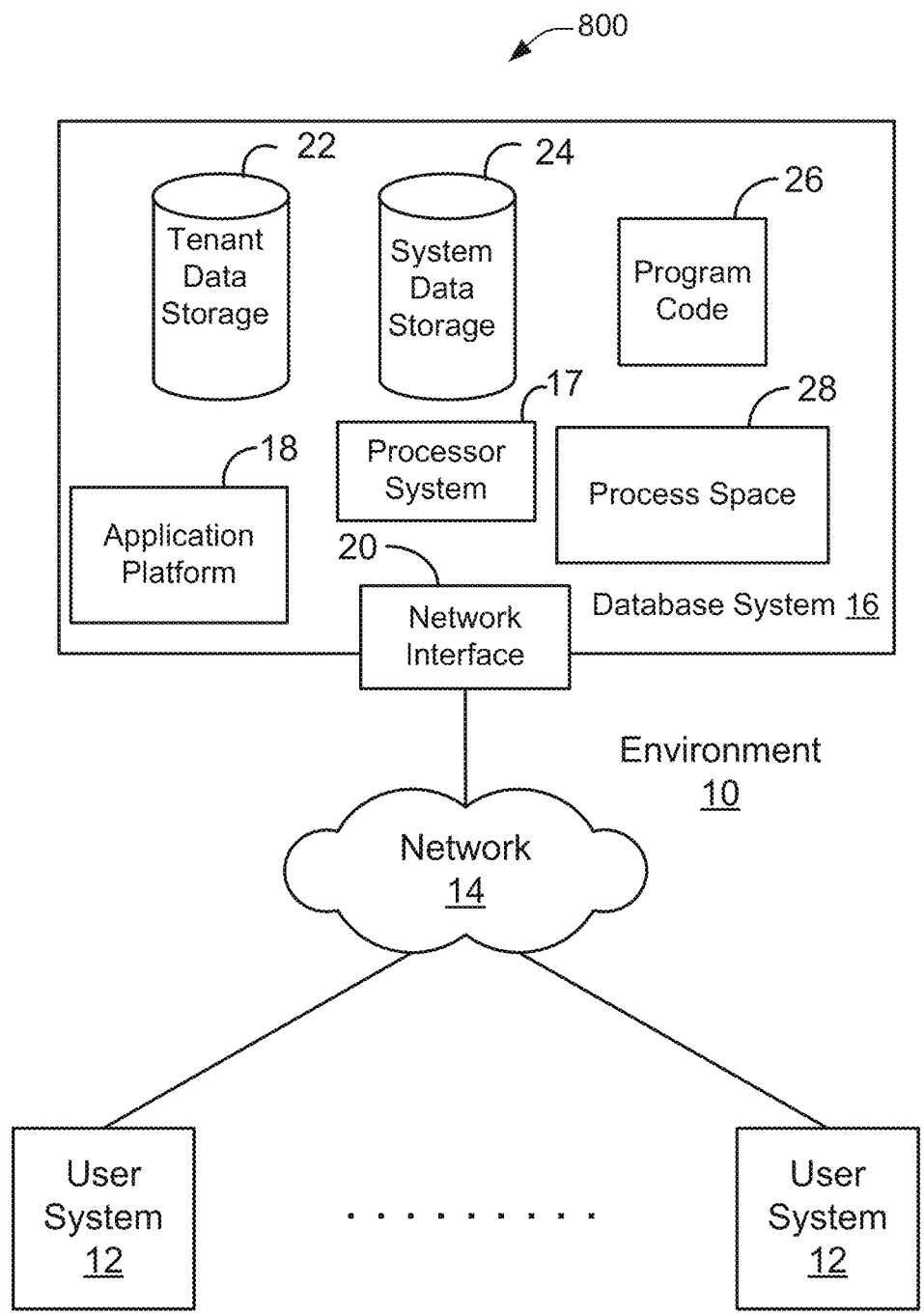
FIG. 8A shows a block diagram of an example of an environment 800 in which an on-demand database service can be used, in accordance with some implementations.

FIG. 8A shows a block diagram of an example of an environment 800 in which an on-demand database service can be used, in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
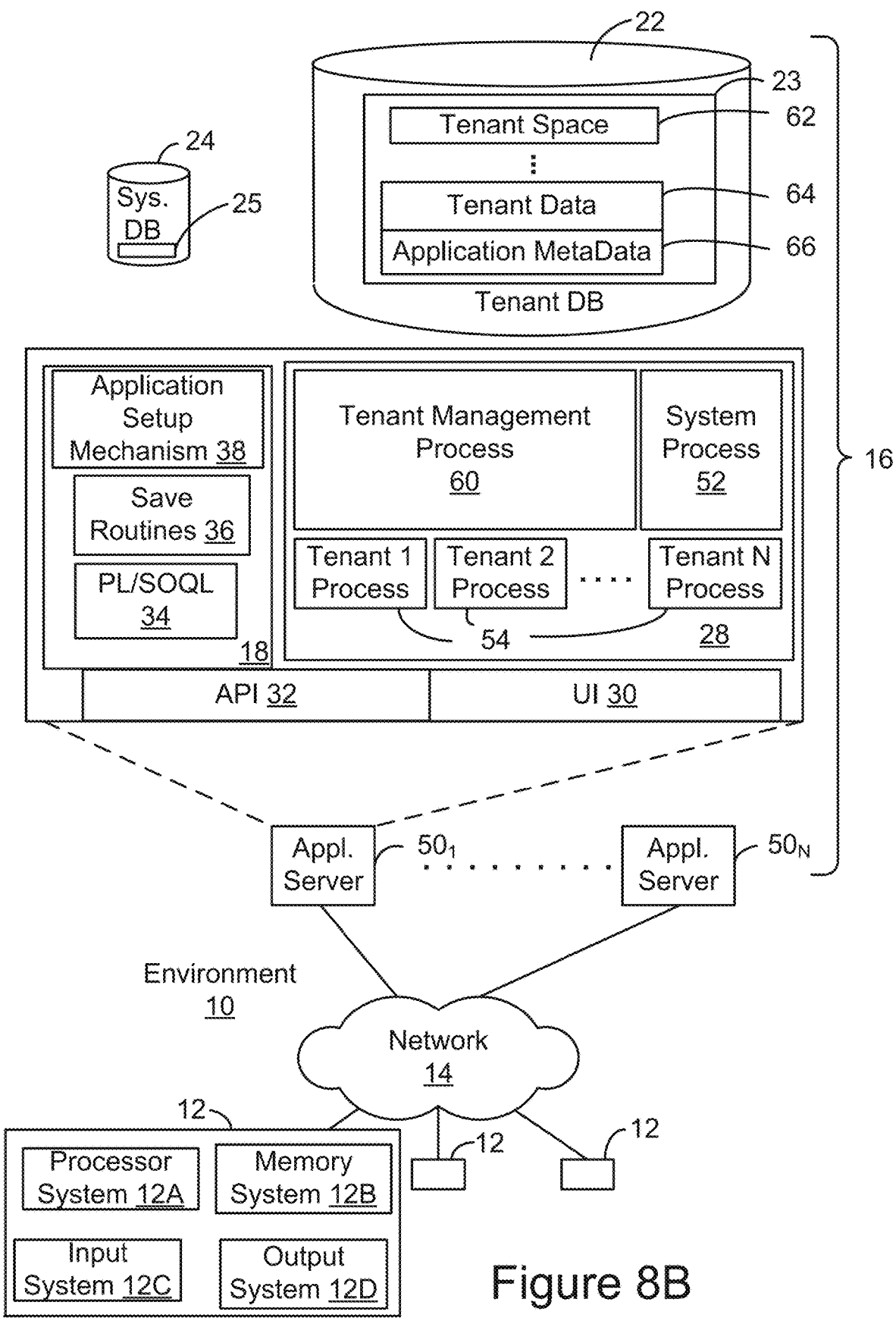
FIG. 8B shows a block diagram of an example of some implementations of elements of FIG. 8A and various possible interconnections between these elements, in accordance with some implementations.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 5B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5

Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
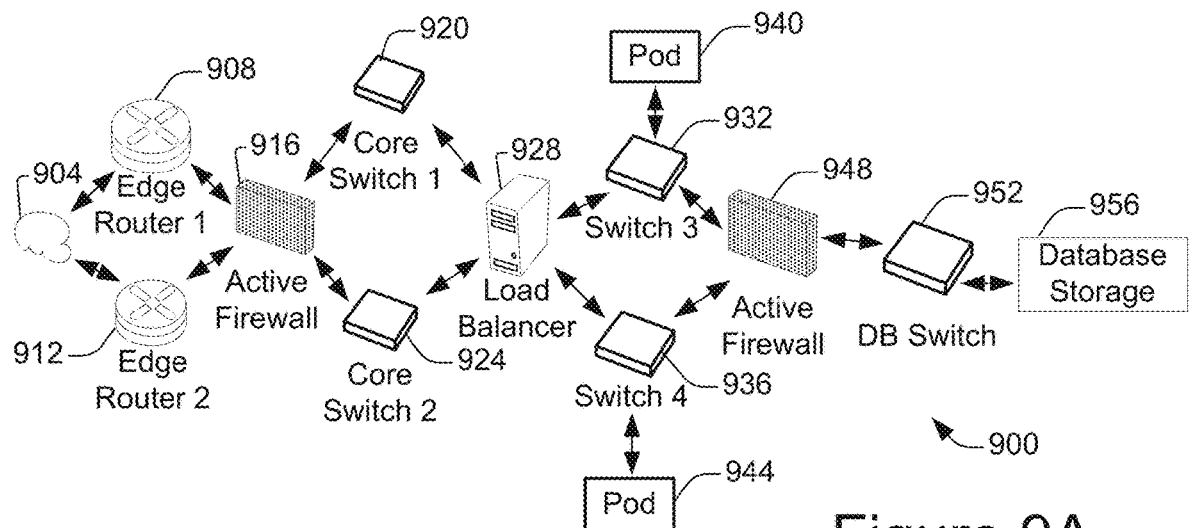
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
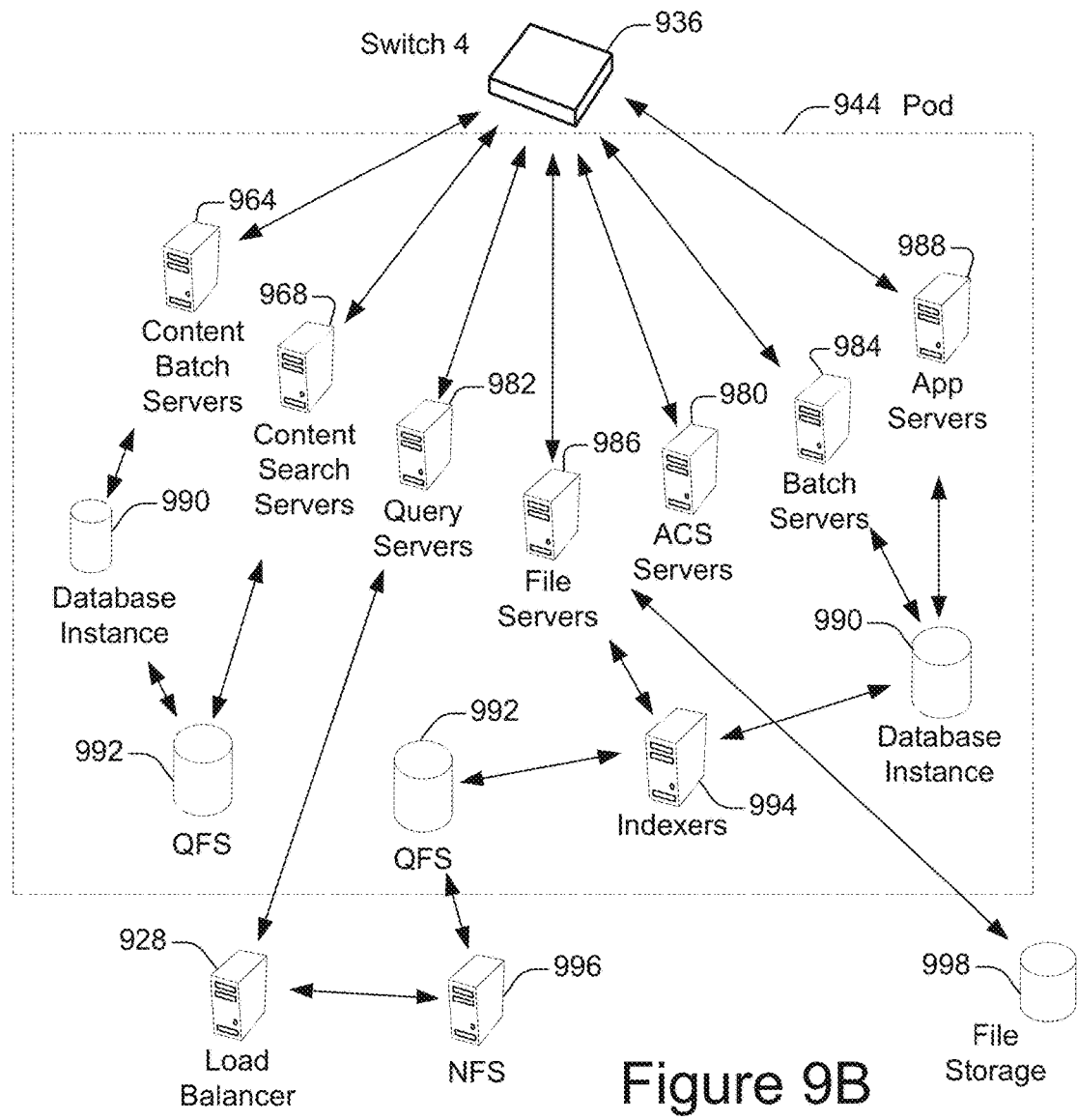
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 8A, 8B, 9A and 9B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 5A and 5B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 8A, 8B, 9A and 9B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system providing customer relationship management (CRM) for an organization, the database system implemented using a server system, the database system configurable to cause:
providing a graphical user interface (GUI) for display by a client device, the GUI including user-selectable options for configuring a prediction engine;
obtaining, from the client device:
a designation of a contact data record as one of a plurality of CRM object types for which prediction is to be performed, the designation of the contact data record based on first user input submitted via one or more of the user-selectable options,
designations of prediction criteria based on second user input submitted via one or more of the user-selectable options, the designations of prediction criteria including at least a specified type of industry;
determining, according to the specified industry type, a length of time for periods of time used to predict generation of contact data records;
identifying, according to the designation of the contact data record, a set of contact data records in one or more data sources;
filtering the set of contact data records based, at least in part, upon the prediction criteria to identify two or more sets of data, each of the sets of data corresponding to a different period of time having the determined length of time, each of the sets of data being a respective subset of the set of contact data records that were generated during the corresponding period of time;
determining, from a first one of the sets of data, a first quantity of contact data records generated during a corresponding first period of time;
determining, from a second one of the sets of data, a second quantity of contact data records generated during a corresponding second period of time that is subsequent to the first period of time;
predicting a third quantity of contact data records to be generated during a third period of time according to the prediction criteria based, at least in part, on the first quantity of contact data records and the second quantity of contact data records; and
providing an indication of the third quantity of contact data records predicted to be generated during the third period of time according to the prediction criteria.

2. The system of claim 1, wherein contact data records are configurable.

3. The system of claim 1, the database system further configurable to cause:
predicting characteristics of individuals associated with the third quantity of contact data records based, at least in part, on the first set of data, the second set of data, and user profiles of individuals identified in the first and second sets of data.

4. The system of claim 1, wherein predicting the third quantity of contact data records according to the prediction criteria is further based, at least in part, on social data, wherein the prediction criteria indicate at least one of: a source of the social data or a type of the social data.

5. The system of claim 1, wherein predicting the third quantity of contact data records is further based, at least in part, on information pertaining to a product or service that has been released or is scheduled to be released.

6. The system of claim 1, wherein predicting the third quantity of contact data records according to the prediction criteria is performed using a computer-generated model based, at least in part, on a first weight associated with the first quantity of contact data records and a second weight associated with the second quantity of contact data records.

7. A computer program product for providing customer relationship management (CRM) for an organization, the computer program product comprising computer-readable program code capable of being executed by one or more processors when retrieved from a non-transitory computer-readable medium, the program code comprising instructions configurable to cause:
providing a graphical user interface (GUI) for display by a client device, the GUI including user-selectable options for configuring a prediction engine;
obtaining, from the client device:
a designation of a contact data record as one of a plurality of CRM object types for which prediction is to be performed, the designation of the contact data record based on first user input submitted via one or more of the user-selectable options,
designations of prediction criteria based on second user input submitted via one or more of the user-selectable options, the designations of prediction criteria including at least a specified type of industry;
determining, according to the specified industry type, a length of time for periods of time used to predict generation of contact data records;
identifying, according to the designation of the contact data record, a set of contact data records in one or more data sources;
filtering the set of contact data records based, at least in part, upon the prediction criteria to identify two or more sets of data, each of the sets of data corresponding to a different period of time having the determined length of time, each of the sets of data being a respective subset of the set of contact data records that were generated during the corresponding period of time;
determining, from a first one of the sets of data, a first quantity of contact data records generated during a corresponding first period of time;
determining, from a second one of the sets of data, a second quantity of contact data records generated during a corresponding second period of time that is subsequent to the first period of time;
predicting a third quantity of contact data records to be generated during a third period of time according to the prediction criteria based, at least in part, on the first quantity of contact data records and the second quantity of contact data records; and
providing an indication of the third quantity of contact data records predicted to be generated during the third period of time according to the prediction criteria.

8. The computer program product of claim 7, wherein contact data records are configurable.

9. The computer program product of claim 7, the program code further comprising instructions configurable to cause:

predicting characteristics of individuals associated with the third quantity of contact data records based, at least in part, on the first set of data, the second set of data, and user profiles of individuals identified in the first and second sets of data.

10. The computer program product of claim 7, wherein predicting the third quantity of contact data records according to the prediction criteria is further based, at least in part, on social data, wherein the prediction criteria indicate at least one of: a source of the social data or a type of the social data.

11. The computer program product of claim 7, wherein predicting the third quantity of contact data records is further based, at least in part, on information pertaining to a product or service that has been released or is scheduled to be released.

12. A method for providing customer relationship management (CRM) for an organization, the method comprising:
  providing a graphical user interface (GUI) for display by a client device, the GUI including user-selectable options for configuring a prediction engine;
  obtaining, from the client device:
    a designation of a contact data record as one of a plurality of CRM object types for which prediction is to be performed, the designation of the contact data record based on first user input submitted via one or more of the user-selectable options,
    designations of prediction criteria based on second user input submitted via one or more of the user-selectable options, the designations of prediction criteria including at least a specified type of industry;
  determining, according to the specified industry type, a length of time for periods of time used to predict generation of contact data records;
  identifying, according to the designation of the contact data record, a set of contact data records in one or more data sources;
  filtering the set of contact data records based, at least in part, upon the prediction criteria to identify two or more sets of data, each of the sets of data corresponding to a different period of time having the determined length of time, each of the sets of data being a respective subset of the set of contact data records that were generated during the corresponding period of time;
  determining, from a first one of the sets of data, a first quantity of contact data records generated during a corresponding first period of time;
  determining, from a second one of the sets of data, a second quantity of contact data records generated during a corresponding second period of time that is subsequent to the first period of time;
  predicting a third quantity of contact data records to be generated during a third period of time according to the prediction criteria based, at least in part, on the first quantity of contact data records and the second quantity of contact data records; and
  providing an indication of the third quantity of contact data records predicted to be generated during the third period of time according to the prediction criteria.

13. The method of claim 12, wherein contact data records are configurable.

14. The method of claim 12, the method further comprising:
  predicting characteristics of individuals associated with the third quantity of contact data records based, at least in part, on the first set of data, the second set of data, and user profiles of individuals identified in the first and second sets of data.

15. The method of claim 12, wherein predicting the third quantity of contact data records according to the prediction criteria is further based, at least in part, on social data, wherein the prediction criteria indicate at least one of: a source of the social data or a type of the social data.

16. The method of claim 12, wherein predicting the third quantity of contact data records is further based, at least in part, on information pertaining to a product or service that has been released or is scheduled to be released.

17. The method of claim 12, wherein predicting the third quantity of contact data records according to the prediction criteria is performed using a computer-generated model based, at least in part, on a first weight associated with the first quantity of contact data records and a second weight associated with the second quantity of contact data records.

* * * * *